US010734928B1

(12) United States Patent
Sood et al.

(10) Patent No.: US 10,734,928 B1
(45) Date of Patent: Aug. 4, 2020

(54) APPARATUS AND METHOD TO HARVEST QUADRATURE ENCODER SIGNALS FROM GENERIC STEPPER MOTOR INPUT SIGNALS

(71) Applicant: Omron Corporation, Kyoto (JP)

(72) Inventors: Siddharth Sood, Puyallup, WA (US); Donald Broadbent, Maple Valley, WA (US); Jesse Kolstad, Fife, WA (US); David Naddor, Duluth, GA (US)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/370,947

(22) Filed: Mar. 30, 2019

(51) Int. Cl.
*H02P 6/18* (2016.01)
*H02P 8/14* (2006.01)

(52) U.S. Cl.
CPC . *H02P 6/18* (2013.01); *H02P 8/14* (2013.01)

(58) Field of Classification Search
CPC .................................. H02P 6/18; H02P 8/14
USPC ..................................................... 318/696, 34
See application file for complete search history.

(56) References Cited

U.S. PATENT DOCUMENTS

| 4,255,693 A | 3/1981 | Keidl |
| 5,006,772 A | 4/1991 | Dandy |
| 5,990,643 A | 11/1999 | Holling |
| 6,081,091 A | 6/2000 | Mitchell |
| 6,483,270 B1 | 11/2002 | Miyazaki |
| 6,788,024 B2 | 9/2004 | Kaneko |
| 7,072,778 B2 | 7/2006 | Swanson |
| 7,116,070 B2 | 10/2006 | MacKay |
| 7,777,436 B2 * | 8/2010 | Brown ................... H02P 6/182 318/400.01 |

FOREIGN PATENT DOCUMENTS

GB        2424853 A        10/2006

OTHER PUBLICATIONS

NOR, Arymaswati Binti Abdullah, "An Application of Observer for Position Sensorless Stepper Mortor Drives"; Faculty of Electrical Engineering, (2009); 19 pp.
Oceguera, A.; et al., Real-Time Step Motor Emulator for Hardware-in-the-Loop Simulation; Conference Paper, Science 306-313 (2010); 2 pp.

* cited by examiner

*Primary Examiner* — David Luo
(74) *Attorney, Agent, or Firm* — Morgan, Lewis & Bockius LLP

(57) ABSTRACT

A signal conditioning apparatus includes a timing extractor to received one or more stepper motor drive signal and convert each into a corresponding virtual quadrature trigger signal. A resolution scaler is coupled to an output of the timing extractor to scale the virtual quadrature trigger signals to adjust the transition frequency, thereby adjusting the resolution of an image captured by a camera receiving the trigger signals to be different than the print resolution created by the motor drive signals. A quadrature decoder is coupled to the output of the resolution scaler, wherein the quadrature decoder extracts timing and direction information from the virtual quadrature trigger signals received from the resolution scaler.

21 Claims, 10 Drawing Sheets

APPARATUS AND METHOD TO HARVEST QUADRATURE ENCODER SIGNALS FROM GENERIC STEPPER MOTOR INPUT SIGNALS

TECHNICAL FIELD

The disclosed embodiments relate generally to printers and in particular, but not exclusively, to an apparatus and method to harvest quadrature encoder signals from generic stepper motor input signals in a printer.

BACKGROUND

Printers come in various types and with various print resolutions. Regardless of the resolution, however, some applications require high-quality printing. One such application is printing one-dimensional or two-dimensional bar codes on labels or other media that can then be attached to or associated with another object, so that information about the object can be retrieved simply by scanning the associated bar code. These bar codes, especially if they are small, must be accurately printed to ensure that they can later be read by a bar code reader. Smudges, minor misalignments, discontinuous lines, and other such problems can render a printed bar code unreadable.

To help ensure that a particular printer outputs printed bar codes that meet quality standards, a verifier is sometimes coupled to the printer. A verifier commonly includes a camera that captures images of the printed barcode and then analyzes the captured images to verify that the quality of the printed barcode is acceptable. One type of verifier uses a line-scan camera, which captures images one line of pixels at a time and then assembles all the captured lines into a two-dimensional digital image that can be analyzed to determine whether the print quality of the barcode is acceptable. Other verifier embodiments use a two-dimensional image sensor to capture two-dimensional partial images of the bar code, then stitch the two-dimensional partial images together into a two-dimensional image that can be analyzed.

In either case, whether with a line-scan camera or a 2D camera, the camera captures images in response to trigger signals. To accurately capture a complete image of the bar code, these trigger signals must be correlated to the label position or, more commonly, to the position of some element of the printer that serves as a proxy for the label position. The position of a transport roller within a printer—the element of the printer that drives the print medium, such as a label, through the printer—is one such proxy. But measuring the position of the transport roller comes with some problems.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A is a side-view cross-section, FIG. 1B a plan-view cross-section.

DETAILED DESCRIPTION

Embodiments are described of an apparatus, system and method for harvesting quadrature encoder signals from generic stepper motor input signals in a printer. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments.

Figure 1A:
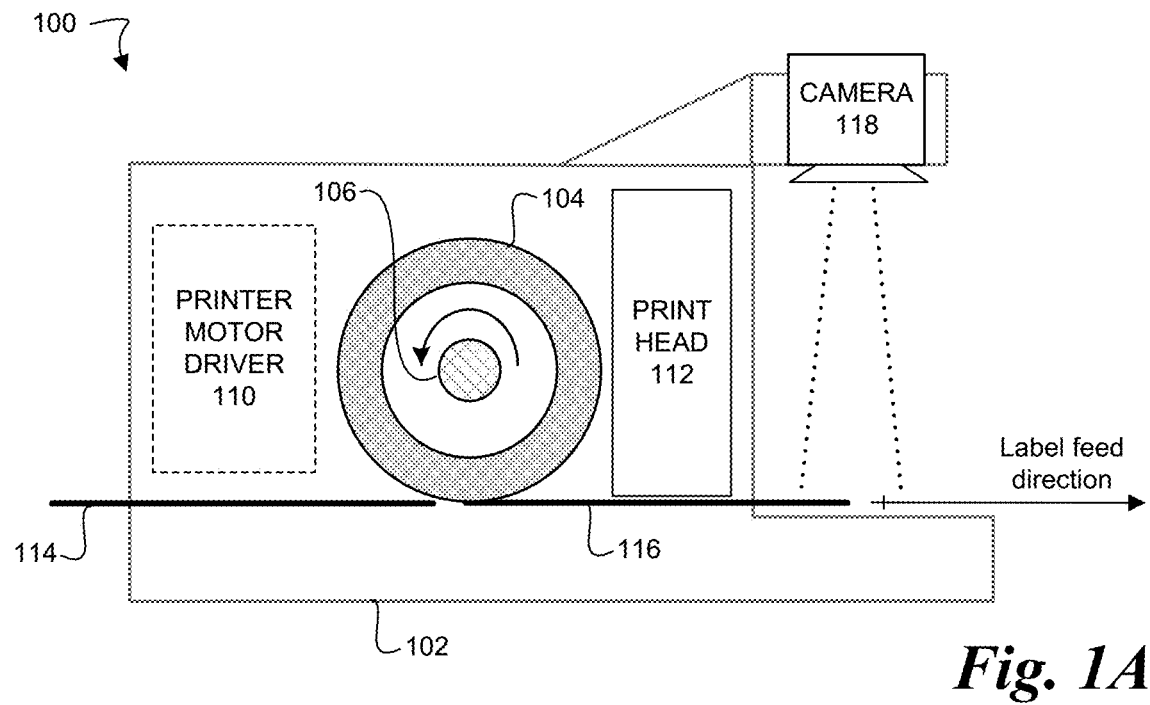
FIGS. 1A-1B are drawings of an embodiment of a printer including a verifier.
Figure 1B:
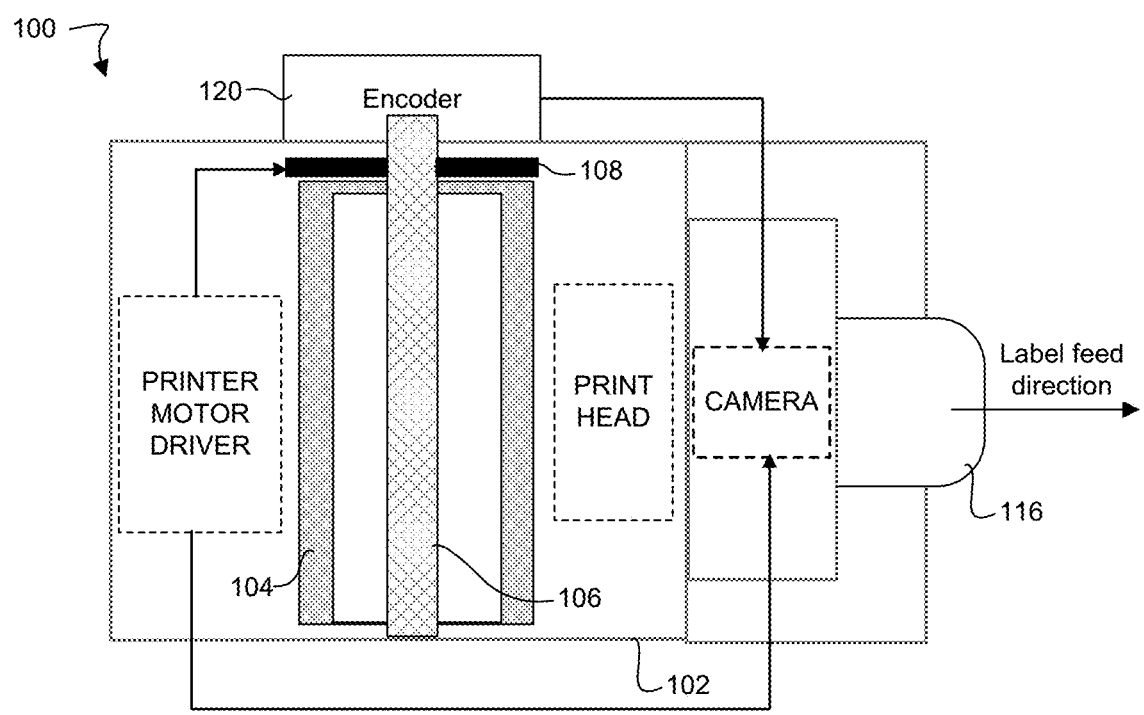

FIGS. 1A-1B together illustrate an embodiment of a printer 100 including a verifier. FIG. 1A is a side cross-section, FIG. 1B a top cross section. Printer 100 includes a housing 102 within which are a roller 104 with a shaft 106 driven by a motor 108, so that when motor 108 spins shaft 106 it also spins roller 104. In the illustrated embodiment roller 104 is a single roller, but in other embodiments roller 104 could be made up of multiple rollers. In one embodiment motor 108 is a stepper motor, but in other embodiments it could be any other type of controllable motor. Printer motor driver 110 is coupled to motor 108 and controls the motion of motor 108—and hence the motion of roller 104, with one or more drive signals. A print head 112 prints information on a medium fed through the printer by roller 104. In one embodiment printer 100 is a thermal printer, such that printer head 112 is a thermal print head and the medium on which it prints is a thermal medium such as thermal paper, but in other embodiments it can be another type of printer. In one embodiment the thermal medium can be thermal labels, but in other embodiments it can be a different type of medium.

In operation, a print medium such as blank label 114 is fed into the printer. Roller 104, driven by motor 108, engages with the label, pulls it into the printer, and directs it by print head 112 so that information can be printed on the label. The printer then outputs a printed label 116 which can be inspected for quality by camera 118. By engaging the labels, roller 104 controls the motion of the labels—i.e., their position and velocity—through the printer. In different embodiments the roller can be unidirectional (i.e., it can rotate in one direction only) or bidirectional (i.e., it can rotate in both directions). Correspondingly, the motion of the labels can be unidirectional (they can move only in the label feed direction indicated in the figure) or bidirectional (they can move in the label feed direction indicated in the figure and in the opposite direction). In still other embodiments the labels can move in additional dimensions, such as in and out of the page.

Camera 118 is positioned at the output end of printer 100 where it can capture an image of the information printed on printed label 116 so that the quality of the printed label can be verified. In one embodiment camera 118 is a line-scan camera that captures a series of single-pixel-width scan lines of parts of the label and then assembles the captured scan lines into a two-dimensional image. In other embodiments camera 118 need not be a line scan camera but can instead be an array-type camera that uses a two-dimensional image sensor array to capture a series of two-dimensional images that can be stitched together to form a complete 2-D image of the label. The resolution of the image captured by camera 118 can be the same or different than the resolution of the information printed on the medium; for instance, in one embodiment printer 110 can print information on label 116 at a resolution of 300 dpi while camera 118 captures a 600 dpi image of the printed label.

Generally, camera 118 captures each individual image in response to a trigger that tells it to capture an image. For camera 118 to accurately capture a series of images of printed label 116, the triggers it receives must be synchronized with the motion of the label—or, more specifically, since the motion of roller 104 controls the motion of the labels, the triggers must be synchronized with the position of roller 104. One way of achieving this synchronization is to couple shaft 106 to a rotary encoder 120 that tracks the angular position of the shaft, and to use angular position information from rotary encoder 120 to trigger image capture in camera 118. Unfortunately, the construction of printer 100 might not allow for addition of the rotary encoder; shaft 106 might not extend far enough to attach the encoder, and there might not be anywhere inside or outside housing 102 to mount the encoder. Another way to synchronize the trigger signals for camera 118 with the position of roller 104 is to use the drive signals from printer motor driver 110, with some conditioning, to trigger camera 118.

Figure 2A:
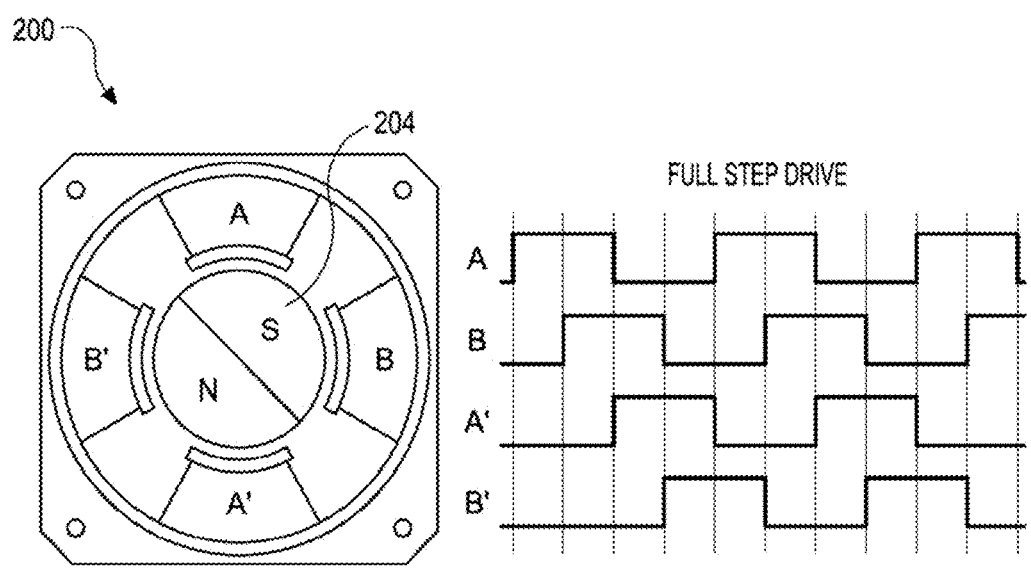
FIG. 2A is a diagram of an embodiment of a four-stator stepper motor showing the waveform of the motor drive signals in an embodiment using full-step drive signals.
Figure 2B:
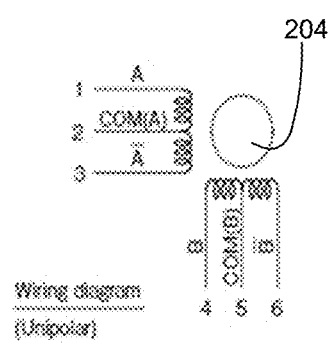
FIG. 2B is a wiring diagram of an embodiment of a unipolar four-stator stepper motor.

FIGS. 2A-2B illustrate an embodiment of a unipolar stepper motor 200. FIG. 2A is a view of the motor and its drive signals, FIG. 2B a wiring diagram. Other embodiments of stepper motor can be bipolar instead of unipolar. In the illustrated embodiment stepper motor 200 has a stator with four poles—labeled A, A', B, and B' in the figure—each with a winding. But other embodiments of stepper motor 200 can have a stator with a different number of poles. Motor phases are made up of sets of one or more poles connected by their windings; when current is applied to a phase, each pole in that phase will be energized and magnetized. Poles 180 degrees opposite each other are magnetized with the same polarity. The illustrated embodiment has two phases (A and B), each with a pole pair (A and A' for phase A, B and B' for phase B) but other embodiments can have more phases than shown. Generally, more poles and more phases result in finer motor control. Stepper motor 200 also includes magnetic shaft (or rotor) 204 centrally positioned relative to the stators and having two poles: a North (N) pole and a South (S) pole. In other embodiments shaft 204 can have more pairs of poles than shown or can be of another construction altogether.

Each pole A, A', B, and B' includes a winding to which drive signals are directed. As shown in FIG. 2B, stepper motor 200 has one winding with center tap per phase. Each section of windings is switched on for each direction of magnetic field. Since in this arrangement a magnetic pole can be reversed without switching the direction of current, the commutation circuit can be made very simple (e.g., a single transistor) for each winding. Typically, given a phase, the center tap of each winding is made common: giving three leads per phase and six leads for a typical two-phase motor.

In operation, stepper motor 200 is actuated by drive signals applied to the four poles/windings. Generally, the drive signals are a set of out-of-phase periodic signals, which in different embodiments can have different waveforms, such as square waves, triangular waves, sawtooth waves, sinusoids, etc. The embodiments discussed below use a pair of square-wave waveforms that are 90 degrees out of phase and can be full-step signals, half-step signals, or micro-step signals, but other embodiments can use motor drive signals with different waveforms than the ones shown and with different phase differences than shown. In a full step drive embodiment, the signals are a set of four square-wave signals, one for each pole, as shown next to stepper motor 200 in FIG. 2A, where signal A corresponds to pole A, signal B corresponds to pole B, pole A' corresponds to pole A' and signal B' corresponds to pole B'. The signals are full-step drive signals because each has only two states—up or down, 0 or 1 , etc.—but others types of signals, such as half-step and micro-step, can be used in other embodiments (see FIGS. 2B-2C). The signal for each stator is 90° out of phase with the signal for the adjacent stator: thus, signal B is 90° out of phase with signal A, signal A' is 90° out of phase with signal B (and hence 180 out of phase with signal A), and so on. Every state transition between signals A/B represents a step of output shaft 204.

Figure 2C:
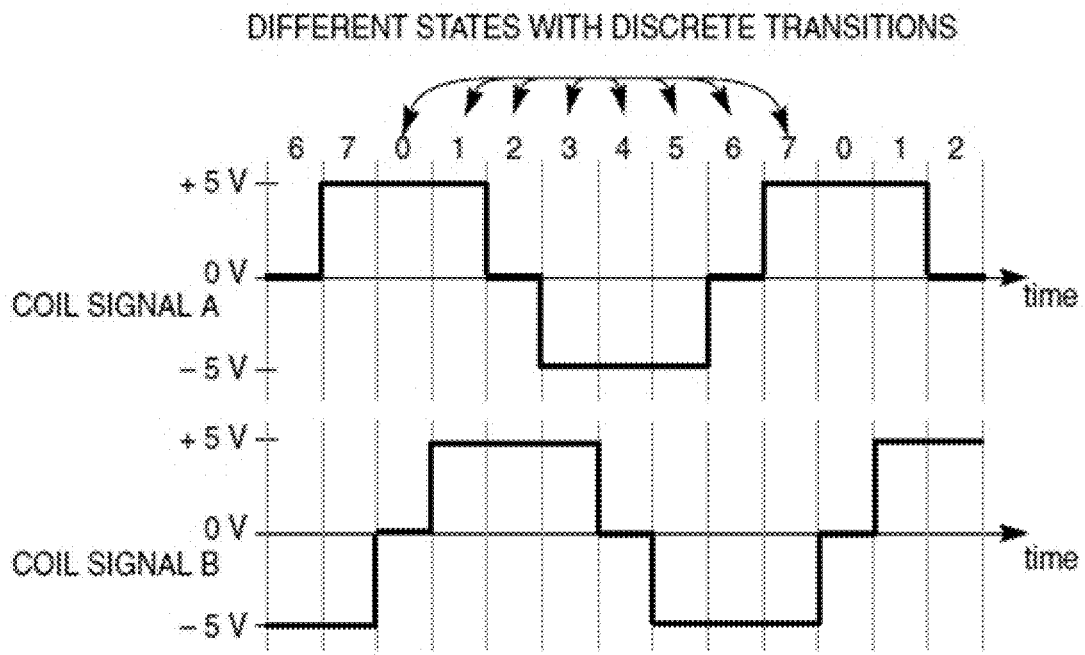
FIGS. 2C-2D are graphs illustrating embodiments of half-step and micro-step drive signals.
Figure 2D:
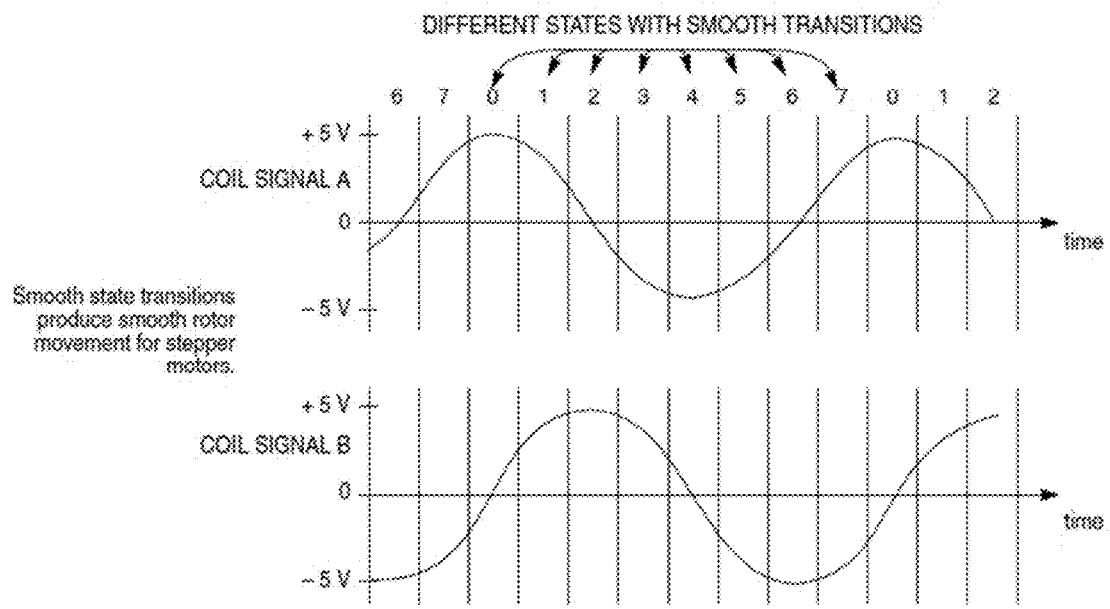

FIGS. 2C-2D illustrate other types of signal that can be used to drive a stepper motor such as motor 200. FIG. 2C illustrates an arrangement with two half-step signals, meaning that each signal has three possible states (+5V, 0V, and −5V in the figure) and therefore more discrete transitions between states: in the illustrated embodiment signals A and B are 90° out of phase, which with the half-step signals gives a total of eight (two signals with three states, so $2^3$) discrete transitions per cycle. Generally, the more discrete transitions between states, the more accurately or finely the resolution of the motor can be controlled. FIG. 2D illustrates a pair of micro-step signals, in which each signal has smooth transitions between states. Smooth state transitions produce smoother rotor movement in stepper motors which, among other things, reduces motor noise.

There are many similarities between the signals actuating the phases of a stepper motor and the two channels A and B of a quadrature encoder used for triggering a camera. The stepper motor drive signals and the encoder trigger signals (i.e., the signals used to trigger image capture by a camera) have the following characteristics in common:

1. The coil or winding actuation signals are out of phase by 90° , just like on the encoder. The direction of the phase difference depends on the direction the encoder/motor is spinning.

2. Every state transition between signals A/B represents a step on the output shaft. This is reasonably true as stepper motors are generally accurate enough to be used in open loop (i.e., without position feedback).

These similarities between stepper-motor drives signals and camera trigger signals can be used to eliminate the need for an external encoder 120 to generate trigger signals for a verification camera used to verify printing, as shown in FIGS. 1A-1B.

Figure 3:
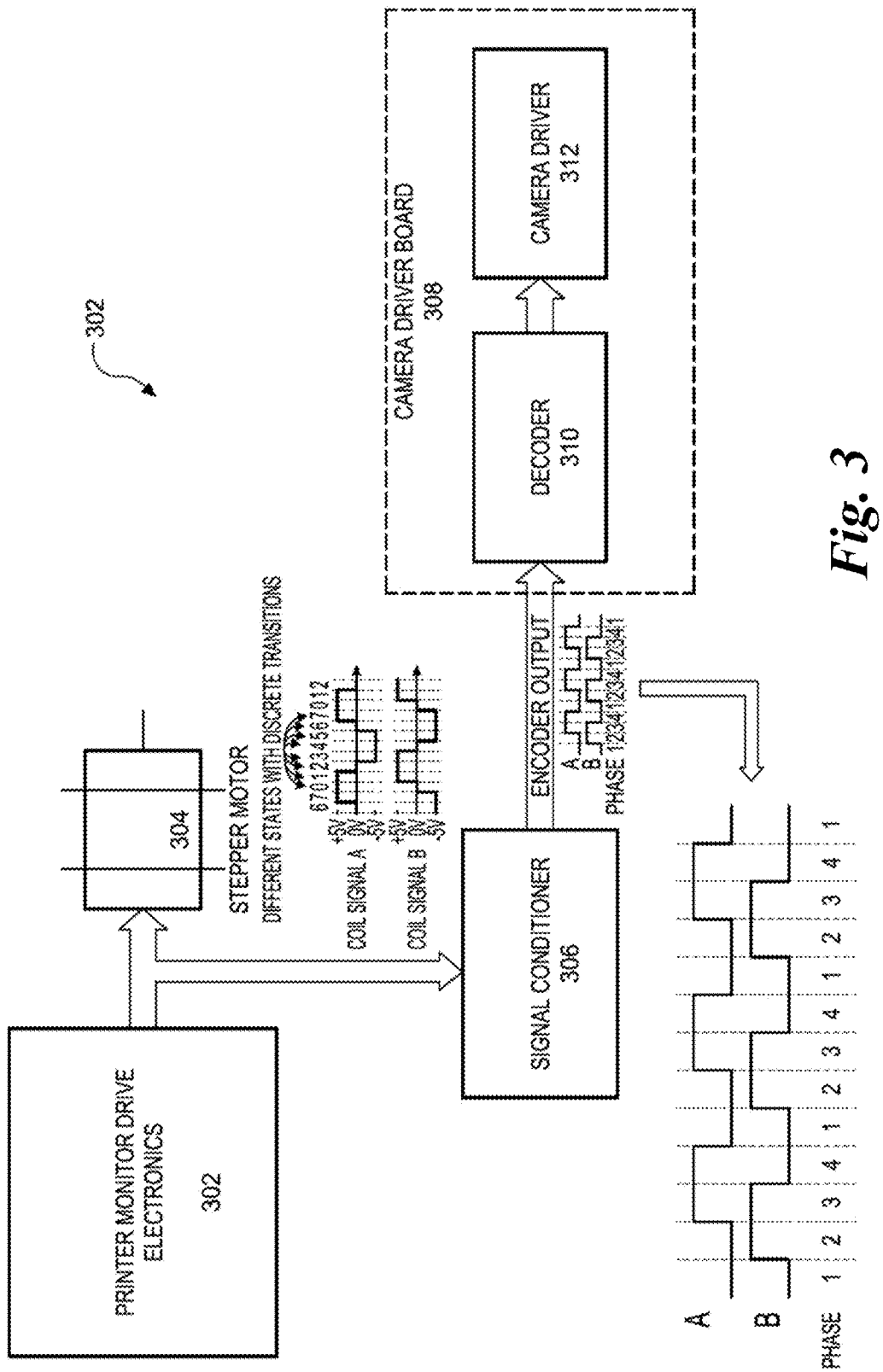
FIG. 3 is a functional block diagram of an embodiment of a printer including a verifier that uses stepper motor drive signals to drive image capture in the verifier's camera.

FIG. 3 illustrates, in a functional block diagram, an embodiment of an apparatus 300 for using stepper motor drive signals to provide trigger signals for a verifier camera, as shown in FIGS. 1A-1B. In apparatus 300, printer motor drive electronics 302 send drive signals to stepper motor 304. In the illustrated embodiment, the motor drive signals are half-step signals, but in other embodiments they can be full-step, micro-step, or some other type of drive signal. Signal conditioner 306 taps into the motor drive signals, processes them, and converts them into a pair of camera trigger signals A and B. In the illustrated embodiment, camera trigger signals A and B are full-step quadrature signals that are 90° out of phase, but in other embodiments trigger signals A and B could be different than shown.

Following the conversion of motor drive signals to camera trigger signals by signal conditioner 306, the encoder output—that is, trigger signals A and B—are sent to camera driver board 308, where they are decoded if necessary by decoder 310 and then sent to camera driver 312 for use in triggering the camera.

Figure 4:
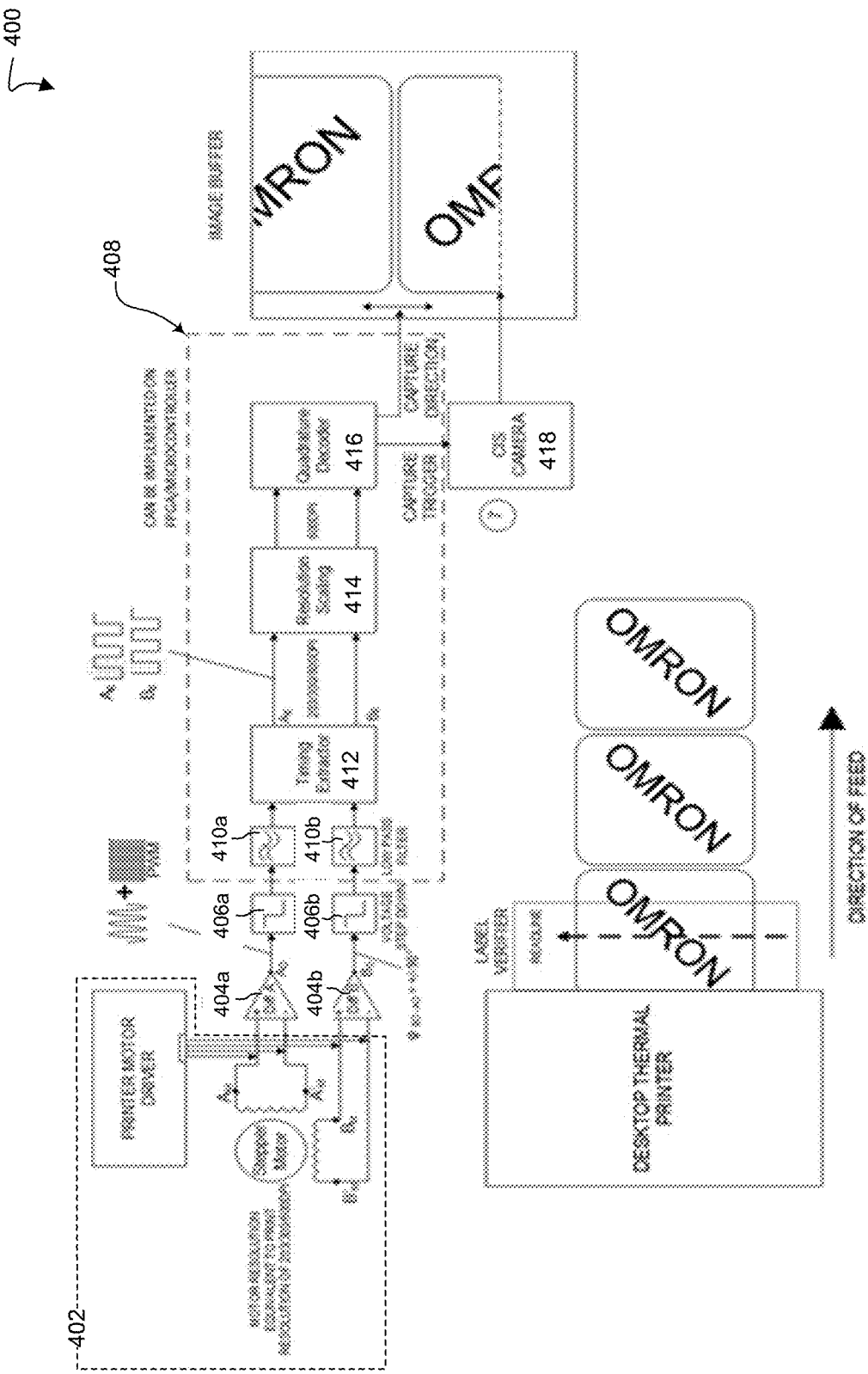
FIG. 4 is a block diagram of a printer including an embodiment of a signal conditioner used to process stepper motor drive signals so that they can be used to drive image capture in a verifier's camera.

FIG. 4 illustrates a printer 400 including an embodiment of a signal conditioner 408 that can receive the printer's stepper motor drive signals and convert them so that they can also be used as trigger signals for a camera to capture images of the labels output by the printer. The illustrated embodiment is for a stepper motor and corresponding drive signals such as those discussed for FIGS. 2A-2D. But other embodiments can, for instance, have a different number of phases than the stepper motor shown in FIG. 2A and thus have a different number of drive signals than shown.

Printer 400 includes a motor assembly 402 coupled to a signal conditioner 408. Printer motor assembly 402 includes a printer motor driver coupled to a stepper motor. The printer motor driver outputs multiple motor drive signals—in this case motor drive signals $A_M$, $A'_M$, $B_M$, and $B'_M$—that drive the stepper motor, as described above for FIGS. 2A-2D.

Differential amplifiers 404a and 404b are coupled to the motor drive signals from the printer motor driver and begin by tapping into the motor drive signals: motor drive signals $A_M$ and $A'_M$ are the inputs to differential amplifier 404a, while motor drive signals $B_M$ and $B'_M$ are the inputs to differential amplifier 404b. Each differential amplifier extracts the complete waveforms driving the stepper motor regardless of motor (unipolar/bipolar) or drive type (full step/half step/micro-step); in general, one would need one differential amplifier per motor phase. Thus, differential amplifier 404a extracts the complete A phase motor drive signal and outputs that signal, while differential amplifier 404b extracts the complete B phase motor drive signal and outputs that signal.

Voltage step-downs 406 are coupled to the outputs of differential amplifiers 404: step-down 406a is coupled to the output of differential amplifier 404a, and step-down 406a is coupled to the output of differential amplifier 404a. Voltage step-downs need not be used in every embodiment, but in some embodiments the voltage of the signals output by differential amplifiers 404a and 404b might be too high for the electronic components within signal conditioner 408. For instance, in some printers the printer motor driver signals can be 50 volt signals, while the electronics in signal conditioner 408 might only be able to handle voltages in the range of 5 volts.

Signal conditioner 408 is coupled to the outputs of voltage step-downs 406. Although the elements within signals conditioner 408 are shown as separate blocks, they can be implemented differently in different embodiments. In one embodiment, for instance, signal conditioner 408 can be implemented in hardware, so that each illustrated component can be a separate electronic component. In another embodiment the functions of the different elements within signal conditioner 408 can be implemented entirely in software on a microcontroller. And in still other embodiments the different elements within signal conditioner 408 can be implemented as software-configured hardware, also known as firmware, on a component such as a field-programmable gate array (FPGA). Implementing signal conditioner 408 on a single microprocessor or an FPGA simplifies the setup and makes it more universal across different printers.

Low pass filters 410a-410b are the first stage of signal conditioner 408. Low pass filter 410a has its input coupled to the output of voltage step-down 406a if present, or if not present then to the output of differential amplifier 404a. Similarly, low pass filter 410b has its input coupled to the output of voltage step-down 406b if present, or if not present then to the output of differential amplifier 404b. Most stepper motor drive signals are pulse width modulated (PWM) signals which include an unmodulated pulse drive signal modulated onto a carrier signal. Low pass filters 410a-410b remove the PWM carrier signal, thus isolating the unmodulated pulse drive signal. But because it can be implemented on digital circuits, the apparatus and concept will work in embodiments without a PWM signal (and therefore without a low pass filter step). For instance, in some embodiments the stepper motor drive signals could be an unmodulated drive signal such as an analog drive signal.

Timing extractor 412 has its inputs coupled to the outputs of low-pass filters 410a-410b. The timing extractor converts the incoming motor phase signals into virtual quadrature encoder signals. In one embodiment this can be accomplished using a hardware Schmitt trigger with symmetric thresholds. Essentially, then, timing extractor 412 acts like an analog-digital converter (ADC) that digitizes the incoming unmodulated motor drive pulse signals (the carrier signal having been removed by low-pass filters) received from the low-pass filters and converts them into digital form (see FIG. 5B). A variant of this hardware can also be used on other drive types such as half step and full step. An FPGA/Microcontroller based approach offers more flexibility than a simple latching hardware solution and can be used to extract the full resolution of the motor in half-step and micro-step modes.

Resolution scaler 414 has its inputs coupled to the outputs of timing extractor 412. Generally, the printer's resolution is determined by the number of transitions in the motor drive signal: more transitions mean more resolution, hence why a half-step drive signal provides greater resolution than a full-step signal. But when using a verifier camera such as camera 118 (see FIGS. 1A-1B), the resolution output by the printer might be different than the resolution required of the camera. For instance, the printer might be set to print at 300 dpi but the verification camera might require a 600 dpi image for verification. Thus, when there is a difference between printer resolution and camera resolution, the camera trigger signals extracted from the motor drive signals by signal conditioner 408 must be adjusted to give the camera its required resolution. Put differently, the frequency of transitions in the extracted trigger signals can be adjusted so that the camera is triggered to capture images at a frequency that will provide the required resolution.

In embodiments where most of the print process occurs at constant velocity, the resolution of the extracted trigger signals can be scaled up/down to match the required verifier resolution of 600 dpi or higher. In an embodiment using trigger signals A and B as shown in FIG. 3 the trigger signals can be scaled to match the exact DPI required of the camera. To accomplish this, in one embodiment the signal can be multiplied (or divided) by a non-integer value. The basic flow of scaling the signals to increase resolution is as follows:

1. Preload a "ratio" value R where 1000/R is the actual ratio desired
2. Either add or subtract R from an internal encoder value when either A or B change.
3. Record a time stamp and the new internal encoder value at each change.
4. Wait for 3 encoder values all moving in the same direction.
5. Use the first derivative to predict the time stamp of next encoder value.
6. Maintain a virtual encoder which increments (or decrements) every 1000.
7. Compute the time that the virtual encoder needs to change.
8. Wait until that time or until A or B change, whichever happens first.
9. Output a bi-phase representation of the virtual encoder each time it needs to change.

Assuming there are three encoder values E1, E2, and E3, and three time stamps T1, T2, and T3, the fourth values—i.e., values for E4 and T4—can be predicted with the following formulas:

$$E4=2*E3-E2$$

$$T4=3*T3-3*T2+T1$$

Quadrature decoder 416 has its inputs coupled to the outputs of resolution scaler 414, so that it receives the scaled trigger signals output by resolution scaler 414. In the illustrated embodiment, the quadrature decoder will decode the input A and B virtual encoder signals to provide timing information for triggering image capture. Quadrature decoder 416 also provides direction information for filling the image buffer. By monitoring the relative phase of signals A and B that are 90° out of phase, the two output channels of the quadrature encoder indicate both position and direction of rotation. If A leads B, for example, roller 104 is rotating in a one direction and the label is moving in a linear direction corresponding to the rotational direction of roller 104. But if B leads A, then roller 104 is rotating in the opposite direction and the label is moving in a linear direction corresponding to the opposite direction.

Camera 418, which is a contact image sensor (CIS), is coupled to an output of quadrature decoder 416 so that it receives the A and B trigger signals. In response to the trigger signals the CIS will capture a line image triggered by the output of the quadrature decoder and will send the data to the main microprocessor which will in turn will append the line to or overwrite an existing line in the image buffer. This approach is not limited to 1D cameras and can be implemented on 2D array cameras as well. Direction information from quadrature decoder 416 is sent to the camera's image buffer so that the line images captured by the camera—line images if the camera is a 1D camera—are assembled into a two-dimensional image in the correct order.

Figure 5A:
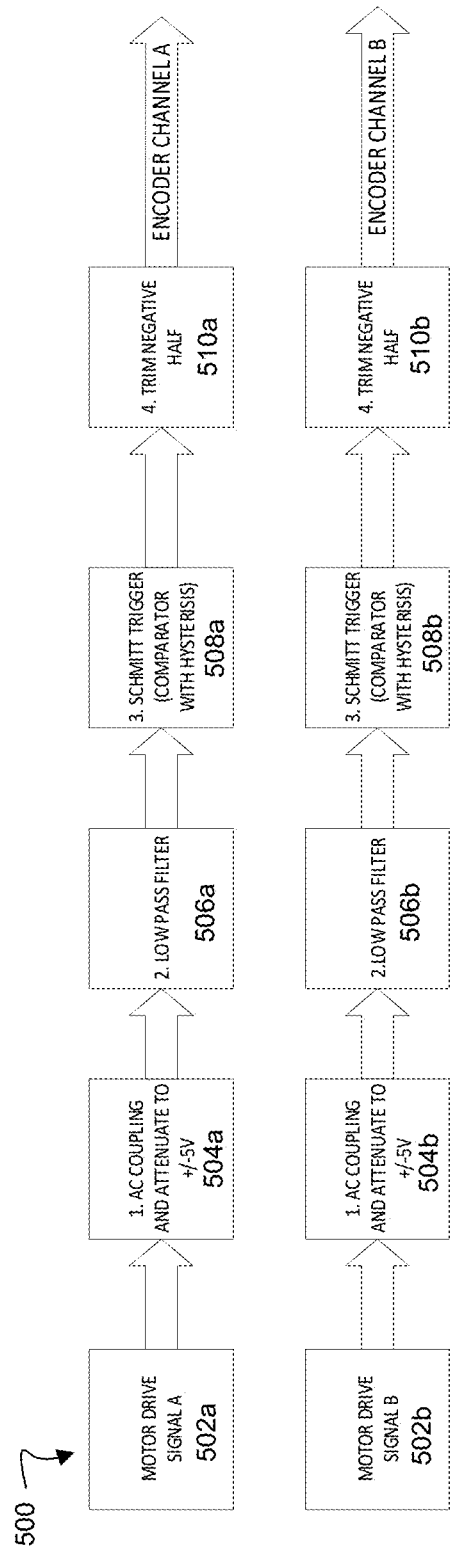
FIGS. 5A is a functional block diagram of an embodiment of a signal conditioner to condition stepper motor drive signals so they can be used to drive image capture in a label verifier's camera.

FIG. 5A illustrates, in a functional block diagram, some of the operation of a signal conditioner such as signal conditioner 408 in FIG. 4. At blocks 504*a* and 504*b* motor drive signals A and B are received from blocks 502*a* and 502 respectively. Blocks 504*a* and 504*b* AC-couple their respective signals to make them symmetrical about the x axis and attenuate the signals (i.e., step them down) to +/−5V. Signals A and B are then passed to blocks 506*a* and 506*b*, where they are low-pass filtered to remove the carrier signal and leave behind the pulse motor drive signals.

Figure 5B:
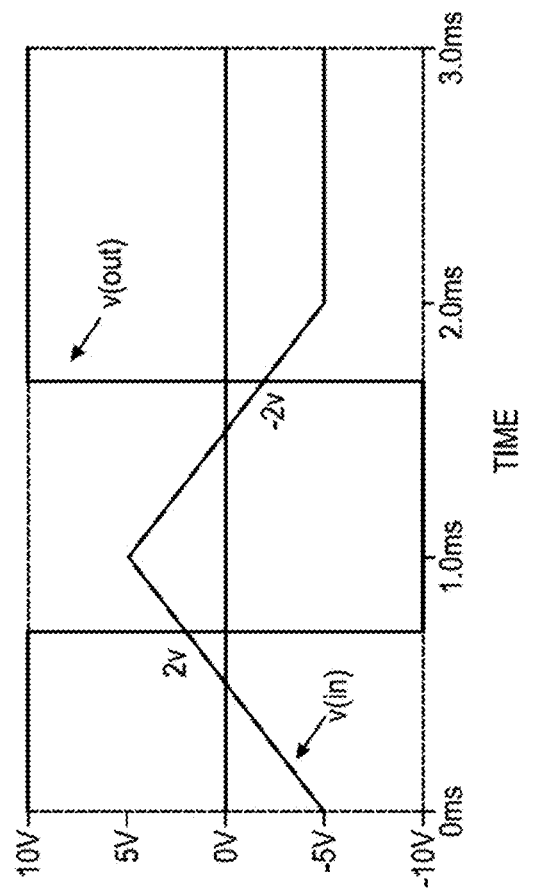
FIG. 5B is a graph showing an embodiment of the operation of the Schmitt triggers shown in the functional block diagram of FIG. 5A.

At blocks 508*a* and 508*b*, the pulse motor drives signals are converted to virtual quadrature signal (i.e., digitized), for instance using a Schmitt trigger, which is a comparator with hysteresis. The Schmitt trigger with symmetric thresholds latches on a rising edge (goes high) and doesn't un-latch (go low) until it encounters a negative rising edge. As shown in FIG. 5B, by using +/−2V thresholds, a +/−5V triangular pulse V(in) can be digitized into a square wave V(out). The Schmitt trigger will output +/−5V, but in some embodiments the negative half can be trimmed at blocks 510*a*-510*b* and can then be input into the camera driver board.

Figure 6:
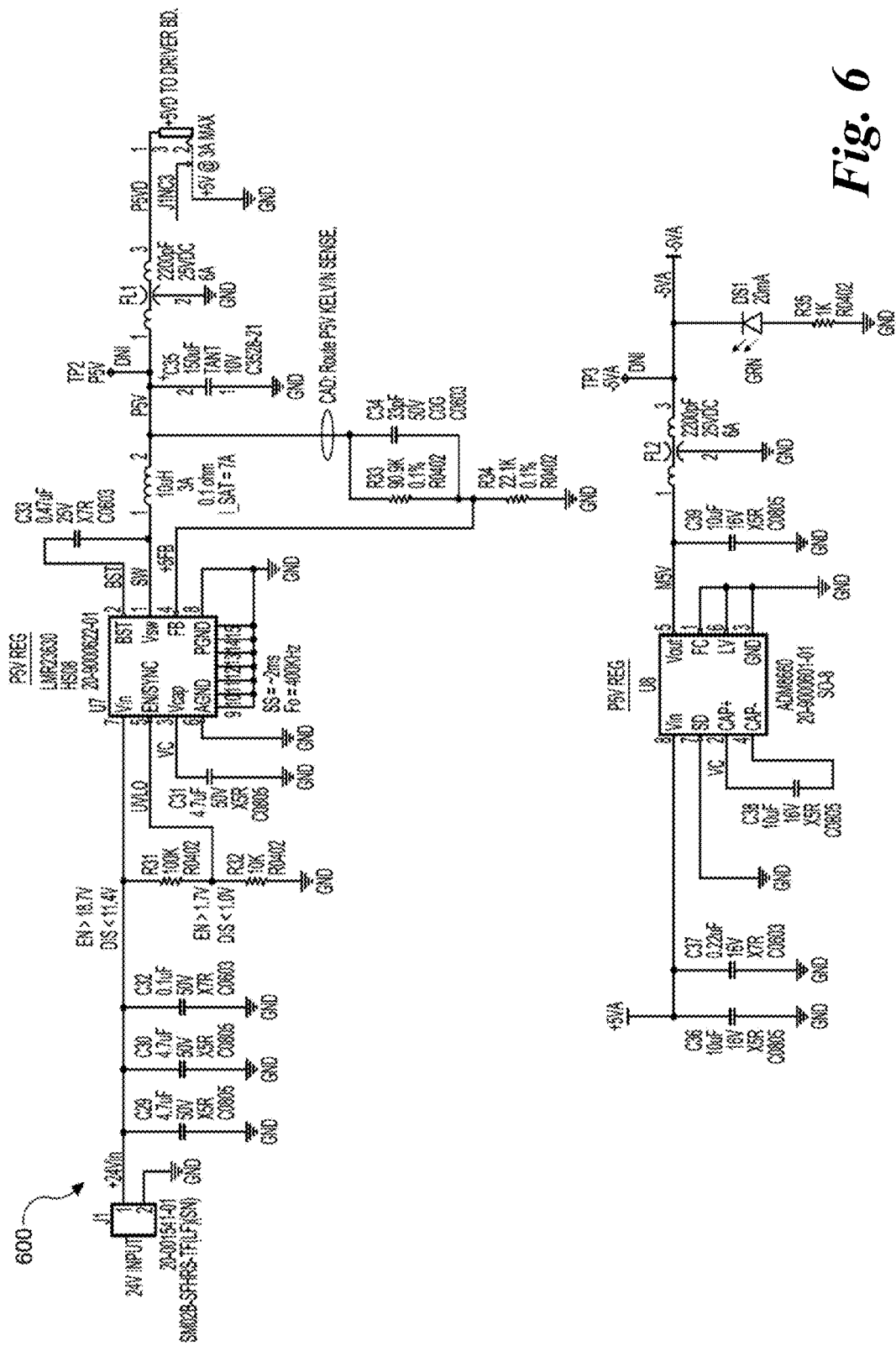
FIG. 6 is a circuit diagram of an embodiment of a power supply circuit that can be used as part of the signal conditioner described in FIGS. 4 and 5A.
Figure 7A:
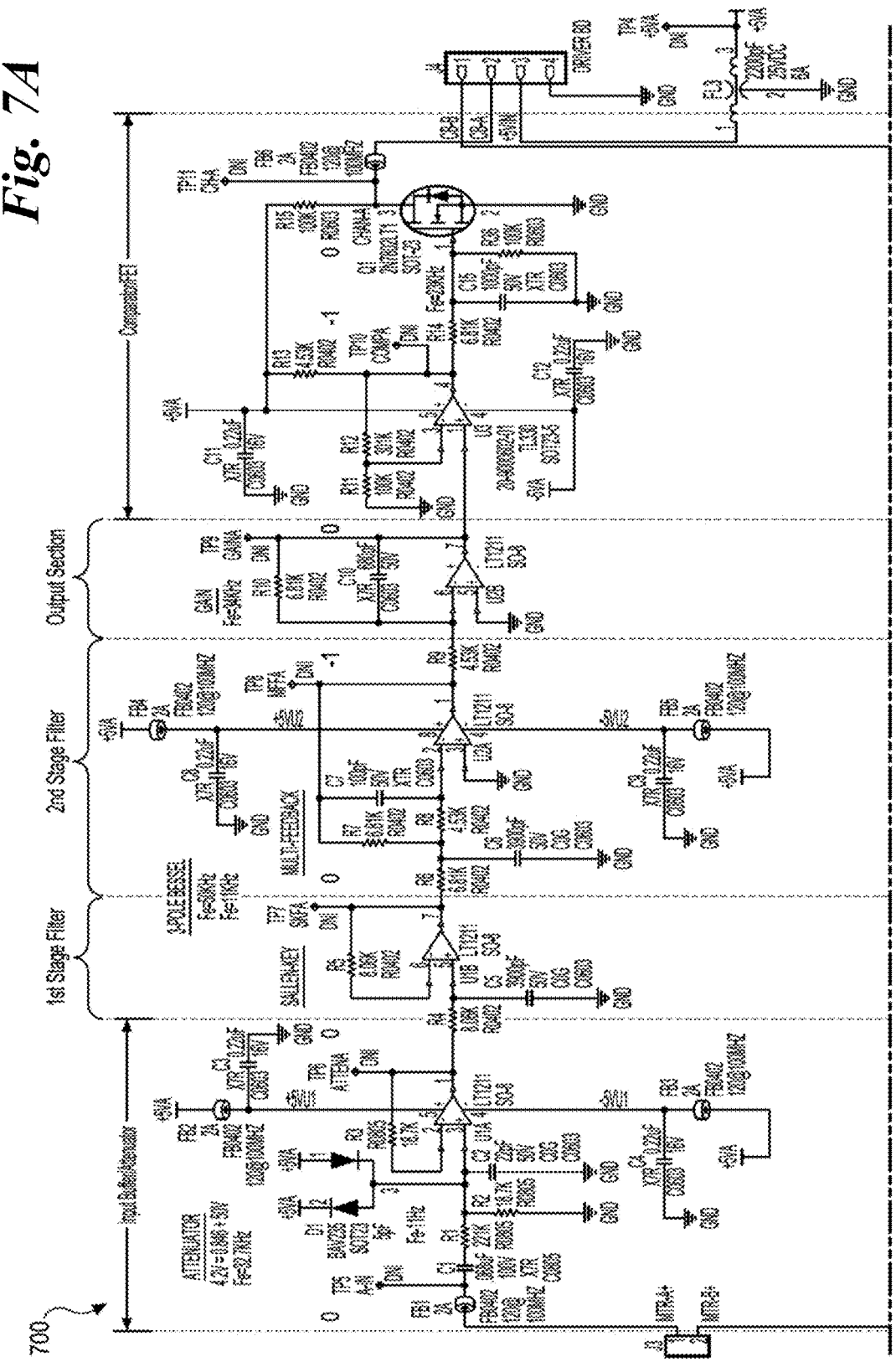
FIGS. 7A-7B together are a circuit diagram of an embodiment of an attenuation, filtration, and output circuit.
Figure 7B:
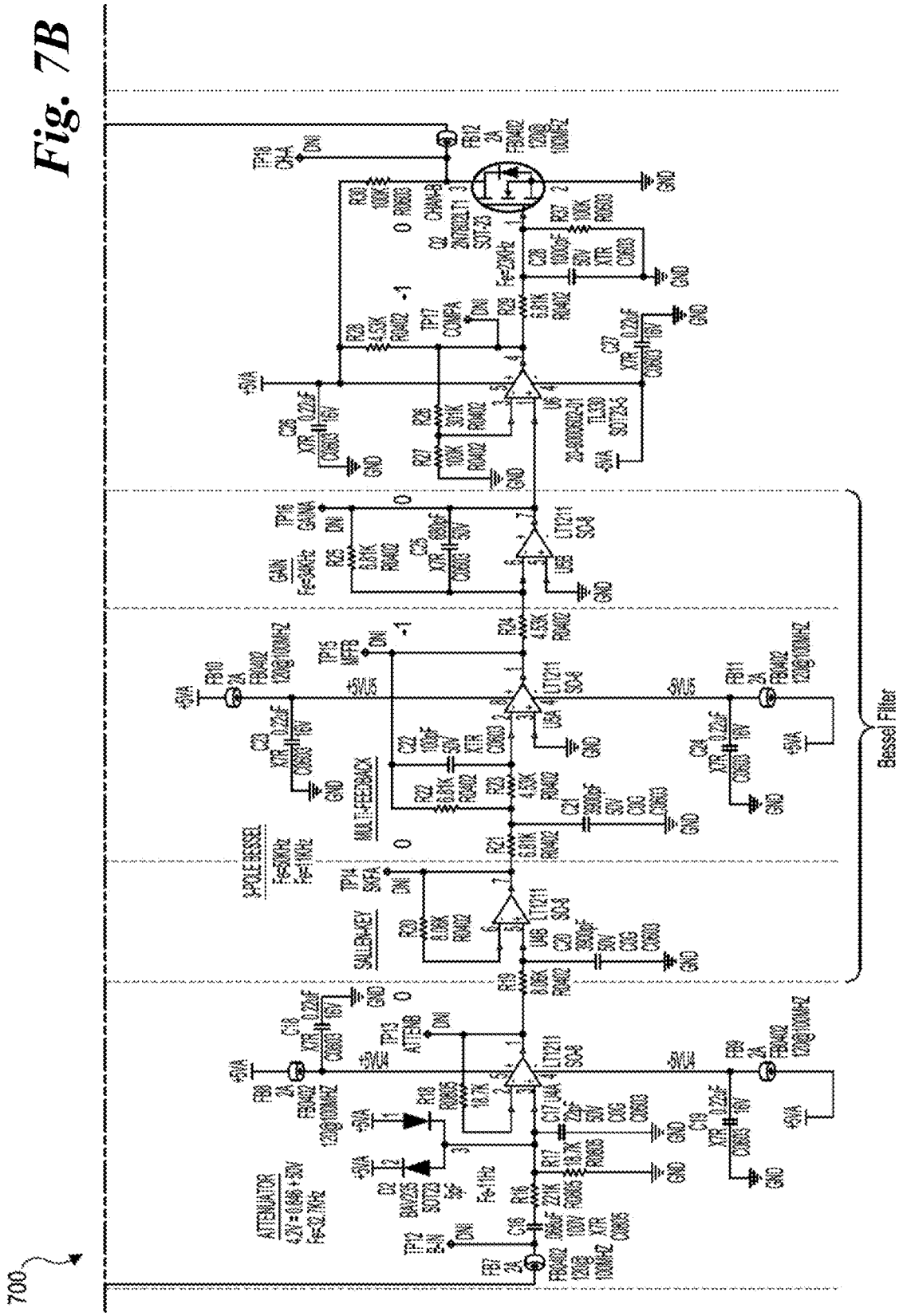

FIGS. 6 and 7A-7B illustrate embodiments of circuits that implement some of the functions in the functional block diagram of FIG. 5A. FIG. 6 illustrates a power supply section, while FIGS. 7A-7B together illustrate a filter section which is duplicated for two motor channels, a Schmitt Trigger comparator with logic-level FET driver for each filter channel, and input protection circuitry for electromagnetic compliance (EMC).

The illustrated circuits together can replace an electromechanical encoder that would typically reside on a printer motor shaft to provide motor position signals (see FIG. 1B). There are times when such an electromechanical encoder is not practical, or not possible, to place into a printer (e.g., insufficient motor shaft length for physical encoder placement). In the illustrated embodiment the circuits, together called a "filter board," connect directly to the motor drive signals as two channel inputs A and B, the filter board attenuates and filters the motor signals and provides logic-level digital tracking signals to a camera driver board for further processing.

FIG. 6 illustrates an embodiment of the power supply sections, which include a +24V to +5V, 15W, down-converter; a +5VA (Analog) filtered input from a driver board; and a −5VA (Analog) inverter circuit powered by the +5VA input. The +/−5VA supplies power the filter op amp circuits.

P5V. The Step-down converter U7 is a T.I. LMR23630 with a +24V input that provides +5.1V @3 Amp maximum output (15W), per this design.

M5A. The +5VA to −5VA negative supply (M5V) is an Analog log Devices ADM8660 CMOS switched capacitor voltage inverter with a maximum output of 100mA (0.5W).

PS start-up. There will be a delay between the +5VA input to the Filter Board and the M5V inverter start-up, which may create an initial +/−5VA supply imbalance to the board op amps. The imbalance may result in a momentary output offset voltage, and possibly generate a pulse from the filter output FET driver. However, a momentary imbalance during start-up is not critical to proper operation in this application.

FIGS. 7A-7B together illustrate an embodiment of the attenuator tor, filter, and output sections. There are two duplicated branches, one for each of signals A and B. The filter op amps are Linear Tech LT1211CS8 which is a precision dual op amp (see datasheet for spec.). Each respective op amp has ferrite beads and bypass caps for supply filtering and EMI reduction.

Input Buffer/Attenuator. The input Buffer/Attenuator circuit (U1A, U4A) AC-couples and limits (i.e., steps down) the 0V to 50 Vpk motor signal to within the +−/5VA power supply limits. The AC-coupling provides bilateral symmetry of the input signal to the filter. The input signal is designed for an attenuation factor of 11.8 per the equation:

$$4.3 Vp\text{-}p = 0.0846 * 50 Vpk$$

The above is within allowable IC voltage swing specifications for +/−5V supplies The motor input signal has a ferrite bead for EMC with input limiting diodes as IC protection. The input Buffer/Attenuator drives the first stage of the Bessel filter that follows.

Bessel Filter. The main filter section consists of a low-pass 3rd-order Bessel filter (equal delay across frequency) that attenuates the 50 KHz motor drive pulses and allows the lower frequency PWM pulses to pass through with sufficient amplitude to trigger a bi-polar output comparator. The entire filter section is designed to be approximately unity gain, and consists of two stages, a single-pole Sallen-Key topology and a two-pole multi-feedback topology. There is an inverting gain stage (U2B, U5B) after the filter section to allow for signal amplitude adjustment if needed, with the present design set for unity. The overall Bessel Filter bandwidth is designed for an upper limit (Fc) of 50 KHz, and a lower −3 dB (Fcl) of 11.7 KHz, which is close to one octave above the expected maximum PWM frequency of 6 KHz. Lower print speeds will generate relatively lower frequency PWM signals.

First-state filter. The first-stage filter (U1B, U4B) is a non-inverting, unity-gain, single-pole, Sallen-Key topology with an isolated low-pass corner frequency at Fcl=20 KHz. This first stage drives the second-stage filter, which is a 2nd-order multi-feedback (MFB) stage.

Second-state filter. The second filter stage is an inverting, unity gain, 2-pole, multi-feedback (MFB) topology with an isolated low-pass corner frequency at Fcl=14.1 KHz. When the first and second stages are connected in series, they form the 3rd-order Bessel with a low-pass corner frequency at Fcl=11.7 KHz (see FIG. 1 below).

Output Section. The Bessel filter's final gain stage (set to unity) inverts the filter signal back to normal phase relative to the input and acts as a driver to the comparator. The gain of this stage can be set by adjusting the resistor value(s) accordingly. The feedback capacitor value may need to change respective to any adjustment of the feedback resistor.

Comparator and FET Output. The comparator is a Texas Inst. TTL331 open-collector single comparator powered by the +/−5VA, where the open-collector output is pulled-up to the +5VA. The topology is a bi-polar Schmitt-trigger to derive the signal edge-timing from both polarities. The comparator gain/hysteresis is set at 1:4, therefore setting the reference level to 1.25V. The reference level is set above the noise floor of the 50 KHz fundamental that remains present from the filter section, although significantly attenuated. The comparator also squares-up the filter output and drives the gate of the output FET. The negative polarity signal from the comparator is ignored by the output FET that generates the required logic-level signals for channels A and B. The signals are then buffered and routed for further processing (losing the negative pulse results in the reduction of line resolution which can then be regenerated by software/firmware).

Figure 8A:
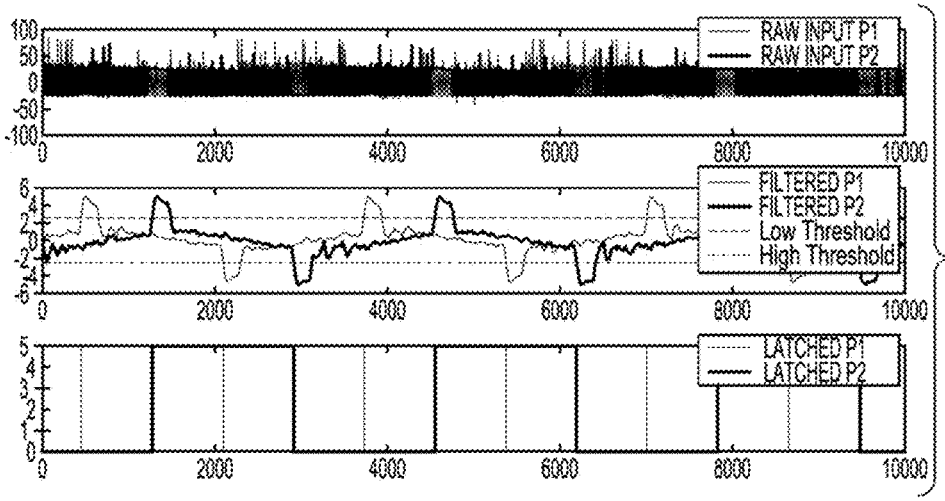
FIGS. 8A-8C are graphs illustrating embodiments of the outputs of an embodiment of a signal conditioner at different label speeds.
Figure 8B:
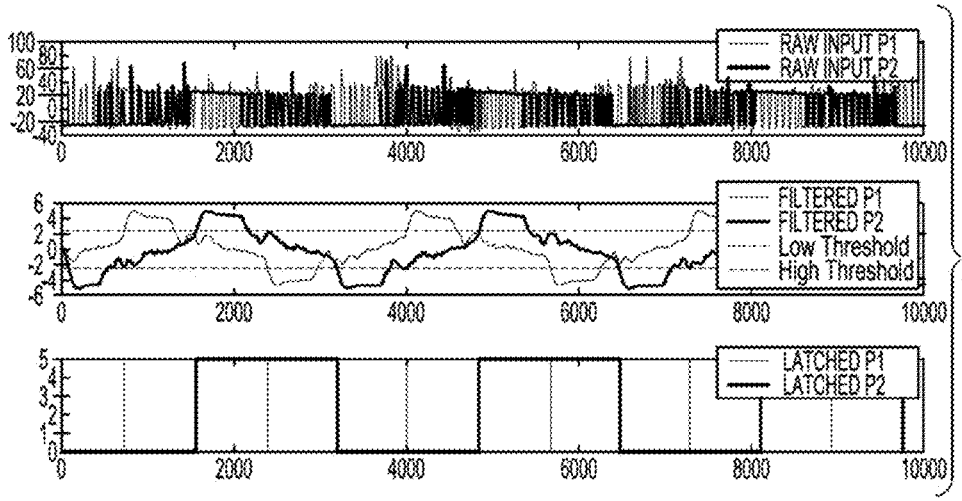
Figure 8C:
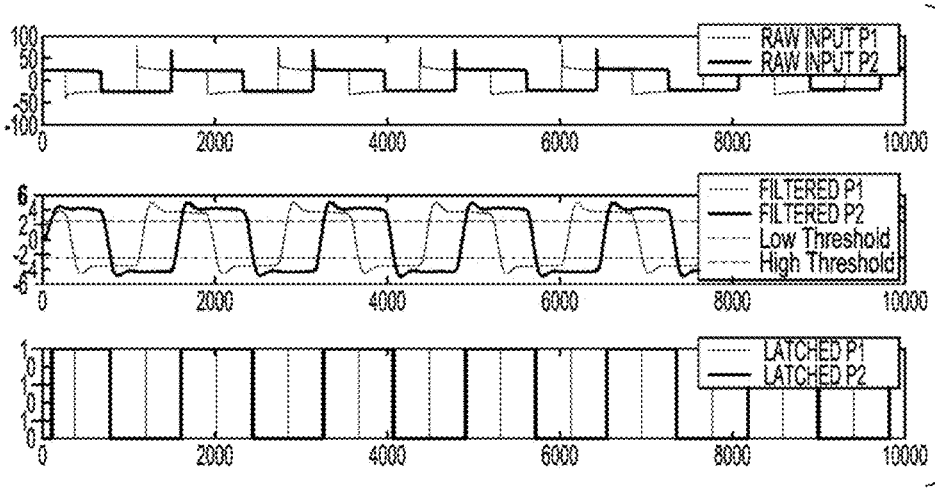

FIGS. 8A-8C are graphs illustrating embodiments of signals output by various stages of an embodiment of a signal conditioner described in FIG. 4 and described by the functional block diagram of FIG. 5A. In each figure, the top graph shows the raw motor drive signal; the middle graph shows the signals after the carrier frequency is filtered out (i.e., at the output of low-pass filters 410a-410b in FIG. 4 or at the output of low-pass filter blocks 506a-506b in FIG. 5A); and the bottom graph shows the output of timing extractor 412 of FIG. 4 or the Schmitt trigger in blocks 508a-508b of FIG. 5A. The different figures illustrate the process at different label speeds: FIG. 8A is at a speed of 2 inches per second, FIG. 8B at 4 inches per second, and FIG. 8C at 8 inches per second.

As can be seen in each set of graphs, the raw signal, shown in the top graph and containing both the A and B signals (shown in red and blue), is filtered to remove the carrier signal, resulting in the signal shown in the second graph, which also shows the extracted pulse signals A and B in red and blue. A pair of upper and lower thresholds, shown green in the second graph of each set, are used to digitize the pulse signals, for instances with the Schmitt trigger described above in connection with FIGS. 5A-5B. The third graph in each figure shows the result of digitizing the signal of the second graph with the illustrated thresholds. The signals shown in the third graph of each figure are virtual quadrature signals that, in the embodiment of FIG. 4, can be further processed by resolution scaler 414 and quadrature decoder 416.

The above description of embodiments is not intended to be exhaustive or to limit the invention to the described forms. Specific embodiments of, and examples for, the invention are described herein for illustrative purposes, but various modifications are possible.

What is claimed is:

1. A signal conditioning apparatus comprising:
   a timing extractor to receive one or more stepper motor drives signals and convert each stepper motor drive signal into a corresponding virtual quadrature trigger signal;
   a resolution scaler coupled to an output of the timing extractor to scale the virtual quadrature trigger signals to adjust the transition frequency, thereby adjusting the resolution of an image captured by a camera receiving the trigger signals so that the image resolution is different than the print resolution created by the motor drive signals; and
   a quadrature decoder coupled to the output of the resolution scaler, wherein the quadrature decoder extracts timing and direction information from the virtual quadrature trigger signals received from the resolution scaler.

2. The apparatus of claim 1 wherein the one or more stepper motor drive signals are modulated drive signals including a carrier signal and an unmodulated drive signal, and further comprising:
   one or more low-pass filters coupled to inputs of the timing extractor, each low-pass filter configured to receive a corresponding modulated stepper motor drive signal, remove the carrier signal from the modulated signal, and output the unmodulated drive signal.

3. The apparatus of claim 2, further comprising one or more voltage step-downs, each coupled to the input of a corresponding low-pass filter.

4. The apparatus of claim 3, further comprising a differential amplifier coupled to both of the unmodulated drive signals.

5. The apparatus of claim 2 wherein each stepper motor drive signal includes two unmodulated drive signals that are out of phase with each other.

6. The apparatus of claim 2 wherein the modulated stepper motor drive signal is a pulse width modulated (PWM) signal.

7. The apparatus of claim 2 wherein the one or more low-pass filters, the timing extractor, the resolution scaler, and the quadrature decoder are implemented in software-configurable hardware.

8. The apparatus of claim 2 wherein the one or more low-pass filters, the timing extractor, the resolution scaler, and the quadrature decoder are implemented in software running on a microcontroller.

9. The apparatus of claim 2 wherein the one or more low-pass filters, the timing extractor, the resolution scaler, and the quadrature decoder are implemented as separate hardware components.

10. The apparatus of claim 1 wherein the resolution scaler scales the virtual quadrature trigger signals based on the velocity of the stepper motor, as determined from the output of the timing extractor.

11. A system comprising:
a printer including a stepper motor coupled to a motor driver that outputs one or more stepper motor drive signals to drive the stepper motor at a first resolution;
a camera positioned to capture images of printed output from the printer; and
a signal conditioner coupled to the motor driver and to the camera, wherein the signal conditioner converts the stepper motor drive signals to camera trigger signals and uses the camera trigger signals to trigger image capture by the camera at a second resolution, the signal conditioner comprising:
a timing extractor to receive the one or more stepper motor drives signals and convert each stepper motor drive signal into a corresponding virtual quadrature trigger signal,
a resolution scaler coupled to an output of the timing extractor to scale the virtual quadrature trigger signals to adjust the transition frequency, thereby adjusting the resolution of an image captured by a camera receiving the trigger signals so that the image resolution is different than the print resolution created by the motor drive signals, and
a quadrature decoder coupled to the output of the resolution scaler, wherein the quadrature decoder extracts timing and direction information from the virtual quadrature trigger signals received from the resolution scaler.

12. The system of claim 11 wherein the camera is a one-dimensional line-scan camera or a two-dimensional array camera.

13. The system of claim 11 wherein the one or more stepper motor drive signals are modulated drive signals including a carrier signal and an unmodulated drive signal, and further comprising:
one or more low-pass filters coupled to inputs of the timing extractor, each low-pass filter configured to receive a corresponding modulated stepper motor drive signal, remove the carrier signal from the modulated signal, and output the unmodulated drive signal.

14. The system of claim 13, further comprising one or more voltage step-downs, each coupled to the input of a corresponding low-pass filter.

15. The system of claim 13 wherein each stepper motor drive signal includes two unmodulated drive signals that are out of phase with each other.

16. The system of claim 13, further comprising a differential amplifier coupled to both of the unmodulated drive signals.

17. The system of claim 13 wherein the modulated stepper motor drive signal is a pulse width modulated (PWM) signal.

18. The system of claim 13 wherein the one or more low-pass filters, the timing extractor, the resolution scaler, and the quadrature decoder are implemented in software-configurable hardware.

19. The system of claim 13 wherein the one or more low-pass filters, the timing extractor, the resolution scaler, and the quadrature decoder are implemented in software running on a microcontroller.

20. The system of claim 13 wherein the one or more low-pass filters, the timing extractor, the resolution scaler, and the quadrature decoder are implemented as separate hardware components.

21. The system of claim 11 wherein the resolution scaler scales the virtual quadrature trigger signals based on the velocity of the stepper motor, as determined from the output of the timing extractor.

* * * * *